United States Patent
Horiyama

(10) Patent No.: US 7,788,364 B2
(45) Date of Patent: Aug. 31, 2010

(54) MANAGEMENT APPARATUS AND METHOD FOR MANAGING NETWORK DEVICE

(75) Inventor: Jun Horiyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 12/255,498

(22) Filed: Oct. 21, 2008

(65) Prior Publication Data
US 2009/0106410 A1   Apr. 23, 2009

(30) Foreign Application Priority Data
Oct. 22, 2007   (JP)   ............... 2007-273360

(51) Int. Cl.
*G06F 15/173*   (2006.01)

(52) U.S. Cl. ............ 709/223; 709/238; 709/245; 709/227; 709/228; 709/242; 711/203; 711/162; 711/171; 711/114; 370/259; 370/392; 370/401; 370/255; 370/398; 370/400

(58) Field of Classification Search .......... 709/223, 709/238, 245, 227, 228, 242; 711/203, 162, 711/171, 114; 370/259, 392, 401, 255, 398, 370/400
See application file for complete search history.

(56) References Cited

U.S. PATENT DOCUMENTS

| 2003/0212783 | A1 | 11/2003 | Sakai | |
|---|---|---|---|---|
| 2006/0159109 | A1* | 7/2006 | Lamkin et al. | 370/401 |
| 2006/0161635 | A1* | 7/2006 | Lamkin et al. | 709/217 |

FOREIGN PATENT DOCUMENTS

JP   2003-323364   11/2003

* cited by examiner

*Primary Examiner*—Jude J Jean Gilles
(74) *Attorney, Agent, or Firm*—Canon U.S.A., Inc., IP Division

(57) ABSTRACT

In the case of displaying a screen for designating a distribution destination of resource data, a resource manager determines an attribute of resource data to be distributed. Based on the determined attribute of the resource data, the resource manager switches a user interface to be used for designating a distribution destination. Then, a distribution data generator generates distribution data to be distributed to the designated distribution destination. Then, a communication function unit distributes the generated distribution data to the designated distribution destination.

11 Claims, 19 Drawing Sheets

FIG. 4

| NAME OF DEVICE | RESOURCE DATA | | | |
|---|---|---|---|---|
| | FONT | | ADDRESS LIST | |
| VDev1 | MINCHO | GOTHIC | ADDRESS LIST 1 | ADDRESS LIST 2 |
| VDev2 | MINCHO | GOTHIC | ADDRESS LIST 2 | |
| VDev3 | MINCHO | | ADDRESS LIST 2 | |
| VDev4 | MINCHO | | ADDRESS LIST 2 | |
| VDev5 | GOTHIC | | ADDRESS LIST 2 | |
| VDev6 | MINCHO | GOTHIC | ADDRESS LIST 2 | |
| VDev7 | GOTHIC | | ADDRESS LIST 2 | |
| VDev8 | MINCHO | GOTHIC | ADDRESS LIST 2 | |
| RDev1 | MINCHO | | ADDRESS LIST 1 | |
| RDev2 | GOTHIC | | ADDRESS LIST 2 | |
| ... | ... | ... | ... | ... |

FIG. 5

| NAME OF VIRTUAL DEVICE | FUNCTION | | | |
|---|---|---|---|---|
| | SCAN | PRINT | FAX | RENDER |
| VDev1 | RDev2 | RDev1 | | RDev3 |
| VDev2 | RDev4 | RDev3 | RDev3 | RDev2 |
| ... | ... | ... | ... | ... |

FIG. 6

| TYPE OF RESOURCE | FUNCTION CORRESPONDING TO RESOURCE TO BE DISTRIBUTED | |
|---|---|---|
| ADDRESS LIST | SCAN | FAX |
| FONT | RENDER | |

FIG. 7

| TYPE OF RESOURCE | DISTRIBUTION METHOD |
|---|---|
| ADDRESS LIST | SELECT PERMISSION OR PROHIBITION |
| FONT | DISTRIBUTE ALL |

| SELECTED DEVICE | RELEVANT DEVICE |
|---|---|
| VDev1 | RDev2 (SCAN) |
| | RDev1 (PRINT) |
| | RDev3 (RENDER) |
| RDev1 | RDev1 |

FIG. 12

| SELECTED DEVICE | DISTRIBUTION DESTINATION DEVICE | RESOURCE DATA TO BE DISTRIBUTED |
|---|---|---|
| VDev1 | RDev1 (PRINT) | ADDRESS LIST OF XX DIVISION |
| RDev1 | RDev1 | ADDRESS LIST OF XX DIVISION |

FIG. 16

| SELECTED DEVICE | DISTRIBUTION DESTINATION DEVICE | RESOURCE DATA TO BE DISTRIBUTED |
|---|---|---|
| RDev1 | RDev1 | ADDRESS LIST OF XX DIVISION |

FIG. 17

CONFIRM STATUS BEFORE AND AFTER DISTRIBUTION OF RESOURCES

LIST OF RESOURCES BEFORE DISTRIBUTION AND RESOURCES AFTER DISTRIBUTION:

| NAME OF DEVICE | BEFORE DISTRIBUTION OF RESOURCE | | | AFTER DISTRIBUTION OF RESOURCE | | | |
|---|---|---|---|---|---|---|---|
| | FONT | | ADDRESS LIST | FONT | | ADDRESS LIST | |
| VDev1 (FOR DEVELOPMENT) | MINCHO | GOTHIC | ADDRESS LIST 1 / ADDRESS LIST 2 | MINCHO | GOTHIC / KAISHO | ADDRESS LIST | ADDRESS LIST FOR DEVELOPMENT |
| VDev2 (FOR DEVELOPMENT) | MINCHO | GOTHIC | ADDRESS LIST 2 | MINCHO | GOTHIC / KAISHO | ADDRESS LIST 2 | ADDRESS LIST FOR DEVELOPMENT |
| VDev3 (FOR DEVELOPMENT) | MINCHO | | ADDRESS LIST 2 | MINCHO | | ADDRESS LIST 2 | |
| VDev4 (FOR DEVELOPMENT) | MINCHO | | ADDRESS LIST 2 | MINCHO | | ADDRESS LIST 2 | ADDRESS LIST FOR DEVELOPMENT |
| VDev5 (FOR DEVELOPMENT) | GOTHIC | | ADDRESS LIST 2 | GOTHIC / KAISHO | | ADDRESS LIST 2 | |
| VDev6 (FOR DEVELOPMENT) | MINCHO | GOTHIC | ADDRESS LIST 2 | MINCHO | GOTHIC / KAISHO | ADDRESS LIST 2 | |
| VDev7 (FOR DEVELOPMENT) | GOTHIC | | ADDRESS LIST 2 | GOTHIC / KAISHO | | ADDRESS LIST 2 | |
| VDev8 (FOR DEVELOPMENT) | MINCHO | GOTHIC | ADDRESS LIST 2 | MINCHO | GOTHIC / KAISHO | ADDRESS LIST 2 | ADDRESS LIST FOR DEVELOPMENT |
| RDev1 | MINCHO | | ADDRESS LIST 1 | MINCHO | | ADDRESS LIST 1 | ADDRESS LIST FOR DEVELOPMENT |
| RDev2 | GOTHIC | | ADDRESS LIST 2 | GOTHIC / KAISHO | | ADDRESS LIST 2 | |
| ... | | | | | | | |

▨ : LIST OF RESOURCES DISTRIBUTED TO VIRTUAL DEVICE
▓ : LIST OF RESOURCES DISTRIBUTED TO REAL DEVICE ( OK )

FIG. 22

| STORAGE MEDIUM, SUCH AS FD OR CD-ROM |
|---|
| DIRECTORY INFORMATION |
| FIRST PROCESSING PROGRAM<br>PROGRAM CODE GROUP CORRESPONDING TO STEPS OF FLOWCHART SHOWN IN FIG. 8 |
| SECOND PROCESSING PROGRAM<br>PROGRAM CODE GROUP CORRESPONDING TO STEPS OF FLOWCHART SHOWN IN FIG. 18 |
| |

MANAGEMENT APPARATUS AND METHOD FOR MANAGING NETWORK DEVICE

BACKGROUND OF THE INVENTION

1. Field of the Invention

The present invention relates to device management processing to be performed by a management apparatus for managing a plurality of network devices connected via a network.

2. Description of the Related Art

In a technology of the related art, for example, in the case where a user sets settings of a peripheral device, such as a printer, connected to a network, a user interface of a printer driver has a function of displaying the reason why a particular setting cannot be made.

With this function, the number of human errors made by users can be reduced (see, for example, Japanese Patent Laid-Open No. 2003-323364).

However, the above-mentioned function relates to settings of a printer driver and does not relate to settings regarding management of resource data in a peripheral device.

In recent years, a network system in which a virtual information processing device is implemented through cooperation of information processing devices, such as a copying machine, a printer, a scanner, a facsimile machine, and a multifunction device, has been discussed.

Under such circumstances, in a network environment where an information processing device, and a virtual information processing device formed by cooperation of information processing devices, coexist, it is necessary to manage resource data, such as font data and address list data, to be distributed to an information processing device.

In this case, it is problematic that management load, arising from management regarding a virtual information processing device that reflects distribution of resource data to an information processing device, increases.

SUMMARY OF THE INVENTION

The present invention provides a mechanism for switching, in accordance with an attribute of resource data to be distributed, a display to be used for designating a distribution destination in order that resource data having a certain attribute is not falsely distributed to an incorrect distribution destination.

An apparatus for managing a plurality of network devices according to an aspect of the present invention includes a memory unit configured to store management information in which a virtual device performing processing by cooperation of functions of network devices, the network devices constituting the virtual device, and the functions implemented by the network devices are associated with each other, a designation unit configured to designate, in accordance with an instruction issued by a user, resource data to be distributed and a distribution destination device to which the resource data is to be distributed, a generation unit configured to, by referring to the management information stored in the memory unit, generate candidate device information including information on a network device and a virtual device relevant to the distribution destination device designated by the designation unit, wherein the candidate device information is used for indicating candidate devices to which the resource data may be distributed, a switching unit configured to, when a confirmation screen, on which the user confirms an actual distribution destination device for the resource data, is displayed based on the distribution destination device designated by the designation unit and the candidate device information generated by the generation unit, switch a display to be used for designating a distribution destination device from among the candidate devices, in accordance with an attribute of the resource data, and a distribution unit configured to distribute, to the distribution destination device designated by the designation unit and the distribution destination device designated on the confirmation screen, the resource data designated by the designation unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates an example of device list information including information on the names of all the devices managed by the management apparatus shown in FIG. 3 and resource data distributed to the individual devices.

FIG. 5 illustrates an example of the correspondence between the names of virtual devices managed by the device list shown in FIG. 4 and devices implementing corresponding functions.

FIG. 6 illustrates an example of the correspondence between the types of resource data shown in FIG. 4 and functions corresponding to the resource data to be distributed.

FIG. 7 illustrates an example of the correspondence between the types of resources shown in FIG. 4 and distribution methods.

FIG. 12 illustrates an example of the correspondence between devices managed by the device manager shown in FIG. 3 and resource data.

FIG. 16 illustrates an example of the correspondence between a device managed by the device manager shown in FIG. 3 and resource data.

FIG. 17 illustrates an example of a user interface displayed on the CRT display shown in FIG. 1.

FIG. 22 illustrates a memory map of a storage medium in which various data processing programs readable by a management apparatus according to an embodiment of the present invention are stored.

DESCRIPTION OF THE EMBODIMENTS

Embodiments of the present invention will be described with reference to the drawings.

First Embodiment

Figure 1:
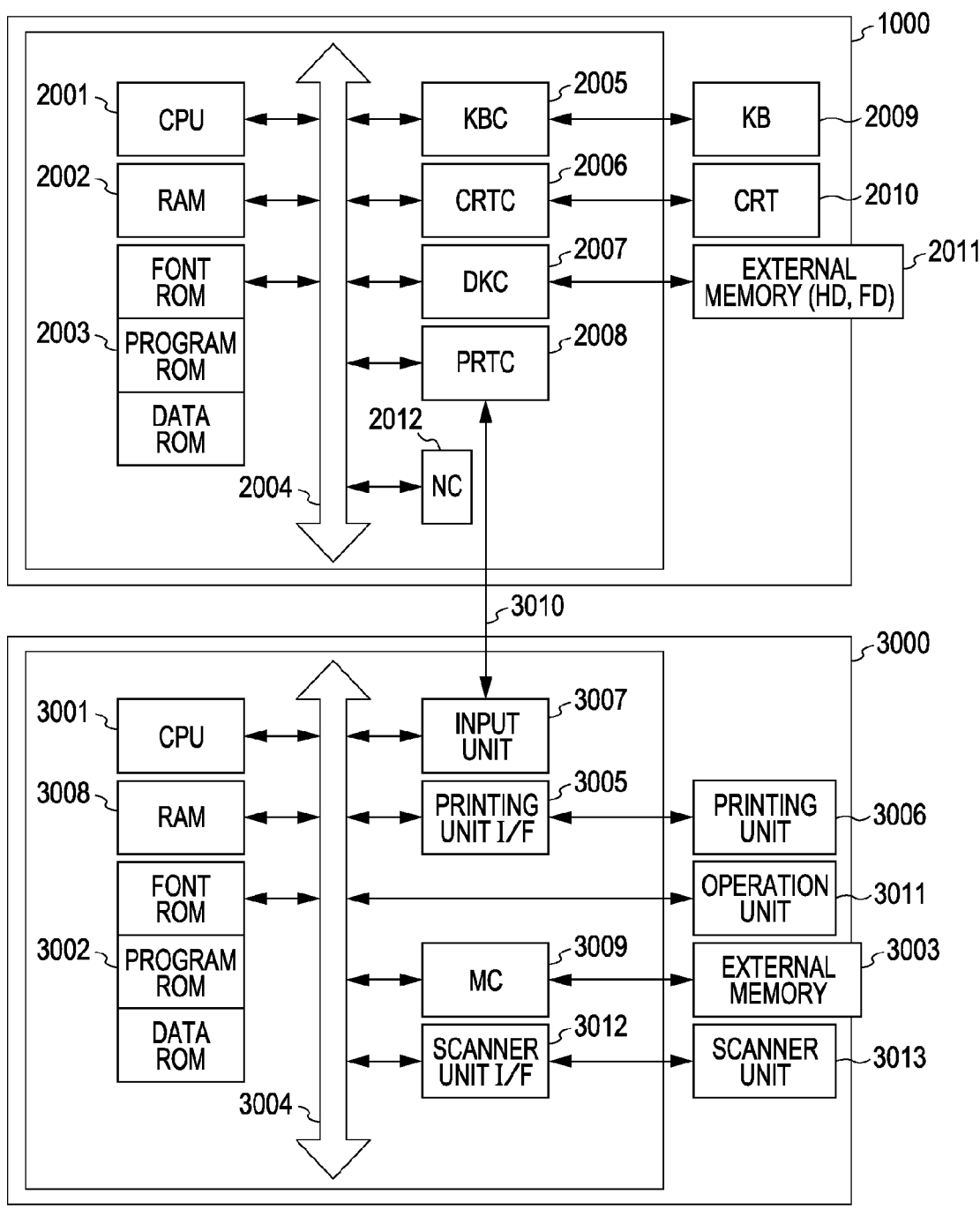
FIG. 1 illustrates an example of a management system to which a management apparatus according to a first embodiment of the present invention is applicable.

FIG. 1 illustrates an example of a management system to which a management apparatus according to a first embodiment of the present invention is applicable. In the management system shown in the example of FIG. 1, a host computer 1000 and an image forming device 3000 are connected to each other via a network or the like in such a manner that the host computer 1000 and the image forming device 3000 are capable of communicating with each other. In this embodiment, a multifunction peripheral (MFP) having a printing function and a scanner function is represented as an example of an image forming device to be managed by the management apparatus. However, the image forming device may be a digital duplicating machine. In addition, such an image forming device has a network communication function, and thus functions as a network device that is capable of communicating with the host computer 1000.

This embodiment will be described in detail with reference to drawings.

The configuration of the host computer 1000 will be described first. Hardware shown in FIG. 1 corresponds to hardware blocks of a general information processing device. The hardware configuration of a general information processing device is applicable to the host computer 1000 according to this embodiment.

Referring to FIG. 1, a central processing unit (CPU) 2001 executes a program, such as an operating system (OS) running on a computer or an application, stored in a program read-only memory (ROM) of a ROM 2003 or loaded from an external memory 2011 into a random-access memory (RAM) 2002. The CPU 2001 controls blocks connected to a system bus 2004 in accordance with the program stored in the program ROM of the ROM 2003 or loaded from the external memory 2011 into the RAM 2002.

Processing of a flowchart, which will be described later, can be implemented by executing a program operating on the OS.

The RAM 2002 functions as a main memory, a work area, and the like of the CPU 2001. A keyboard controller (KBC) 2005 controls key inputs from a keyboard (KB) 2009 and a pointing device (not shown). A cathode-ray tube (CRT) controller (CRTC) 2006 controls a display on a CRT display 2010. A disk controller (DKC) 2007 controls data access to a hard disk (HD), a floppy disk (FD), and the like in which various data are stored.

A PRTC 2008 controls exchange of signals between the host computer 1000 and the image forming device 3000 connected to the host computer 1000. An NC 2012 is connected to a network and performs control of communication with another device connected to the network.

The configuration of the image forming device 3000 will now be described.

Referring to FIG. 1, a CPU 3001 of the image forming device 3000 controls blocks connected to a system bus 3004 in accordance with a control program stored in a ROM 3002 or an external memory 3003.

An image signal generated by the CPU 3001 is output as output information to a printing unit (image forming device engine) 3006 via a printing unit interface (I/F) 3005. The CPU 3001 is capable of communicating with the host computer 1000 via an input unit 3007 and a communication line 3010. Thus, the CPU 3001 is capable of notifying the host computer 1000 of information on the image forming device 3000.

A control program and the like to be executed by the CPU 3001 are stored in a program ROM of the ROM 3002. Font data and the like to be used for generating output information are stored in a font ROM of the ROM 3002. In the case of an image forming device not including an external memory 3003 such as a hard disk, information and the like to be used on the host computer 1000 are stored in a data ROM of the ROM 3002.

A RAM 3008 functions as a main memory, a work area, and the like of the CPU 3001 and is configured in such a manner that the memory capacity of the RAM 3008 can be expanded by connecting an optional RAM to an expansion port (not shown). The RAM 3008 is also used as an output information load area, an environmental data memory area, a non-volatile random-access memory (NVRAM), and the like.

Access to the external memory 3003 is controlled by a memory controller (MC) 3009. The external memory 3003 is connected as an optional memory. Font data, an emulation program, form data, and the like are stored in the external memory 3003. An operation unit 3011 includes a switch to be operated, a light-emitting diode (LED) indicator, and the like.

A scanner I/F 3012 performs correction, processing, and editing on image data received from a scanner unit 3013. The scanner unit 3013 enters, to a charge-coupled device (CCD), reflected light obtained by performing exposure scanning on an image in an original in order to convert information on the image into an electric signal. In addition, the scanner unit 3013 converts the electric signal into luminance signals of R, G, and B colors and reads the luminance signals as image data. When a user issues, by using the operation unit 3011, an instruction to start reading, the instruction to read the original is supplied to the scanner unit 3013.

Upon receiving the instruction, the scanner unit 3013 performs an operation of reading the original. The original may be read in an automatic feed method in which the original is placed on an original feeder (not shown). Alternatively, the original may be placed on a glass plane (not shown) and scanning of the original may be performed by moving an exposure position.

Figure 2:
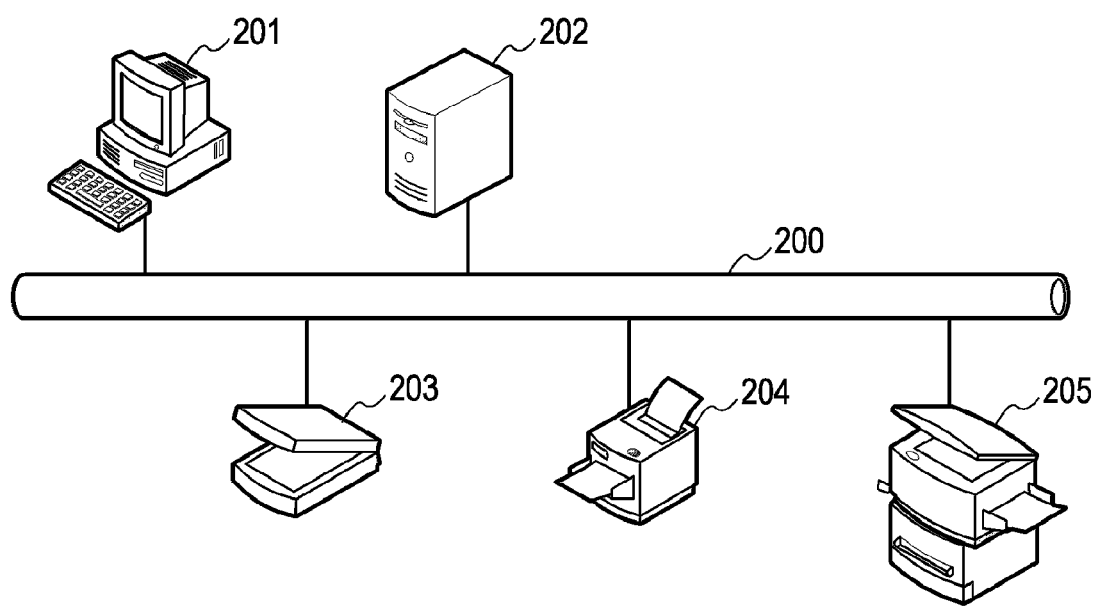
FIG. 2 shows an example of the network configuration of a management system according to an embodiment of the present invention.

FIG. 2 shows an example of the network configuration of the management system according to this embodiment.

The management system includes a client computer 201, a server computer 202 having a function of the management system, and peripheral devices, such as a scanner 203, a printer 204, and a multifunction device 205. The client computer 201, the server computer 202, the scanner 203, the printer 204, and the multifunction device 205 are connected to each other via a network 200 such as a local-area network (LAN). When the scanner 203 and the printer 204 are combined together, a virtual device described later can be established.

An information processing device management program is stored in the server computer 202 in such a manner that the server computer 202 can execute the information processing device management program. The server computer 202 has a function of distributing resource data, such as font data and address listing data, to a peripheral device, as well as a function of managing the scanner 203, the printer 204, and the multifunction device 205.

Figure 3:
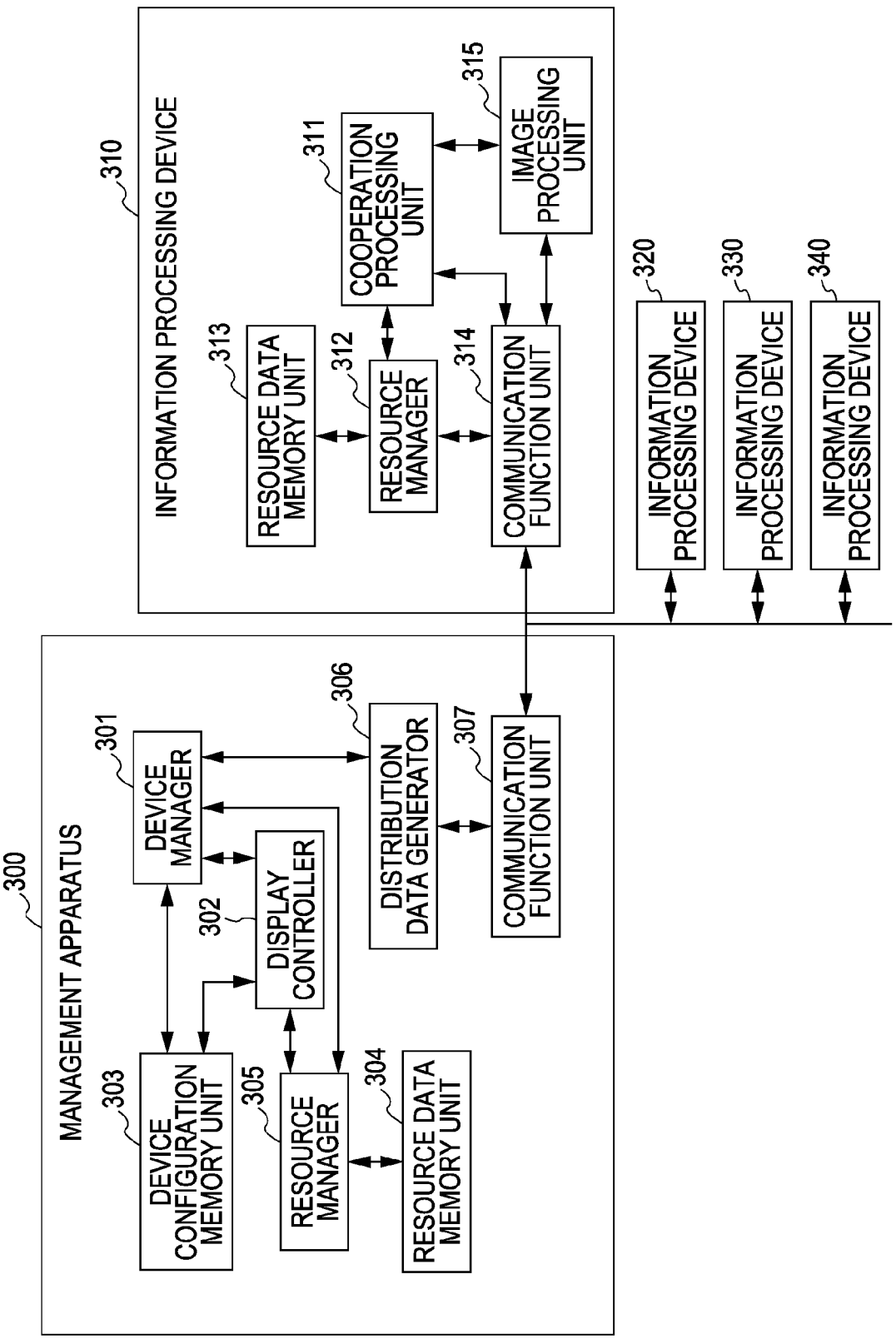
FIG. 3 shows an example of the module configuration of a management apparatus according to an embodiment of the present invention.

FIG. 3 shows an example of the module configuration of the management apparatus according to this embodiment. In the management system shown in FIG. 3, a management apparatus 300 and information processing devices 310, 320, 330, and 340 are capable of communicating with each other via a network. The module configuration of the management apparatus 300 and the module configuration of each of the information processing devices (copying machine/printer/scanner/facsimile machine/multifunction device) 310, 320, 330, and 340 will be described. Since the information processing devices 320, 330, and 340 have configurations similar to the configuration of the information processing device 310, the configurations of the information processing devices 320, 330, and 340 will be omitted.

For the sake of convenience, information processing devices (copying machine/printer/scanner/facsimile machine/multifunction device) are referred to by "devices" (in the drawings, "RDev").

In addition, one used as a virtual device by cooperation of a plurality of such devices is referred to by a "virtual device" (in the drawings, "VDev").

The configuration of the management apparatus 300 will be described first.

A device manager 301 of the management apparatus 300 manages information on a device connected to a network. A specific example of information managed by the device manager 301 will be described with reference to FIG. 4.

FIG. 4 illustrates an example of device list information including information on the names of all the devices managed by the management apparatus 300 shown in FIG. 3 and resource data distributed to the individual devices. The illustration shown in FIG. 4 corresponds to a device list.

In the example shown in FIG. 4, font data "Mincho" and "Gothic" and address list data "address list 1" and "address list 2" are distributed as resource data to a device "VDev1 (virtual device).

A display controller 302 of the management apparatus 300 controls a display of a user interface to be used for setting the settings of the management apparatus 300. Information to be displayed by the display controller 302 is acquired via the device manager 301, a device configuration memory unit 303, and a resource manager 305.

The device configuration memory unit 303 of the management apparatus 300 manages device information for individual functions constituting a virtual device, which is, for example, formed by combining a scanner and a printer together. A specific example of management information stored and managed by the device configuration memory unit 303 will be described with reference to FIG. 5.

FIG. 5 illustrates an example of the correspondence between the names of virtual devices managed by the device list shown in FIG. 4 and devices implementing corresponding functions. The illustration shown in FIG. 5 corresponds to a virtual device table. In the example shown in FIG. 5, a virtual device "VDev1", which is formed by the combination of devices RDev1 to RDev3, performs scanning processing, printing processing, and rendering processing. That is, the resource manager 305 causes the device configuration memory unit 303 to store and manage management information in which network devices constituting a virtual device and functions implemented by the individual network devices are associated with each other.

In addition, in the example shown in FIG. 5, a virtual device "VDev2", which is formed by the combination of devices RDev2 to RDev4, performs scanning processing, printing processing, rendering processing, and facsimile communication processing.

Referring to FIG. 5, in the case of the virtual device "VDev1", the scanning function is implemented by the real device "RDev2". In addition, in the case of the virtual device "VDev1", the printing function is implemented by the real device "RDev1". In addition, in the case of the virtual device "VDev1", the rendering function is implemented by the real device "RDev3".

A resource data memory unit 304 of the management apparatus 300 manages real data such as address list data, font data, and the like to be distributed to a device.

The resource manager 305 manages information on resource data stored in the resource data memory unit 304 and to be distributed to a device.

Specific examples of management information stored in the resource data memory unit 304 will be described with reference to FIGS. 6 and 7.

FIG. 6 illustrates an example of the correspondence between the types of resource data shown in FIG. 4 and functions corresponding to the resource data to be distributed. The illustration shown in FIG. 6 corresponds to a distribution condition table indicating conditions under which distribution items are to be distributed.

Referring to FIG. 6, in the case of the resource type "address list", the "scan" function and "FAX" function exist as functions corresponding to the resource data to be distributed.

In addition, in the case of the resource type "font", the "render" function exists as a function corresponding to the resource data to be distributed.

FIG. 7 illustrates an example of the correspondence between the types of resources shown in FIG. 4 and distribution methods. The illustration shown in FIG. 7 corresponds to a resource data distribution management table.

Referring to FIG. 7, in the case of the resource type "address list", the distribution method is set to "select permission or prohibition".

It is assumed that, in terms of an attribute of the resource data "address list", use of the resource data "address list" is permitted only to a limited user or group.

In contrast, in the case of the resource type "font", the distribution method is set to "distribute all".

The distribution method for the resource data "font" is set to "distribute all" because use of the resource data "font" is not restricted to a particular user or group and the resource data "font" can be used by any device.

Then, a distribution data generator 306 of the management apparatus 300 checks, based on information managed by the device manager 301, information on a distribution destination device and resource information (resource data). Then, the distribution data generator 306 distributes, via a communication function unit 307 of the management apparatus 300, the generated resource data to, for example, the information processing device 310.

The module configuration of the information processing device 310 (copying machine/printer/scanner/facsimile machine/multifunction device) shown in FIG. 3 will now be described.

A cooperation processing unit 311 of the information processing device 310 performs processing in cooperation with another device, for example, the information processing device 320, 330, or 340 in a case where the information processing device 310 operates as a function of a virtual device.

A resource manager 312 of the information processing device 310 manages, in an integrated fashion, distributed resource information such as font data and address list data. A resource data memory unit 313 of the information processing device 310 stores and manages distributed real resource data such as address list data and font data.

A communication function unit 314 of the information processing device 310 receives, via a network, resource data distributed from the management apparatus 300, and transmits the received resource data to the resource manager 312 and an image processing unit 315 of the information processing device 310.

The image processing unit 315 controls an image processing function to be implemented by a copying machine, a printer, a scanner, a facsimile machine, or a multifunction device. In a case where the information processing device 310 operates as a function of a virtual device, the image processing unit 315 notifies, via the cooperation processing unit 311 and the communication function unit 314, another device of the details and result of processing.

The details of a resource distribution control process to be performed by the management system according to this embodiment will be described with reference to a flowchart shown in FIG. 8 and image views of user interfaces shown in FIGS. 12 to 17.

Figure 8:
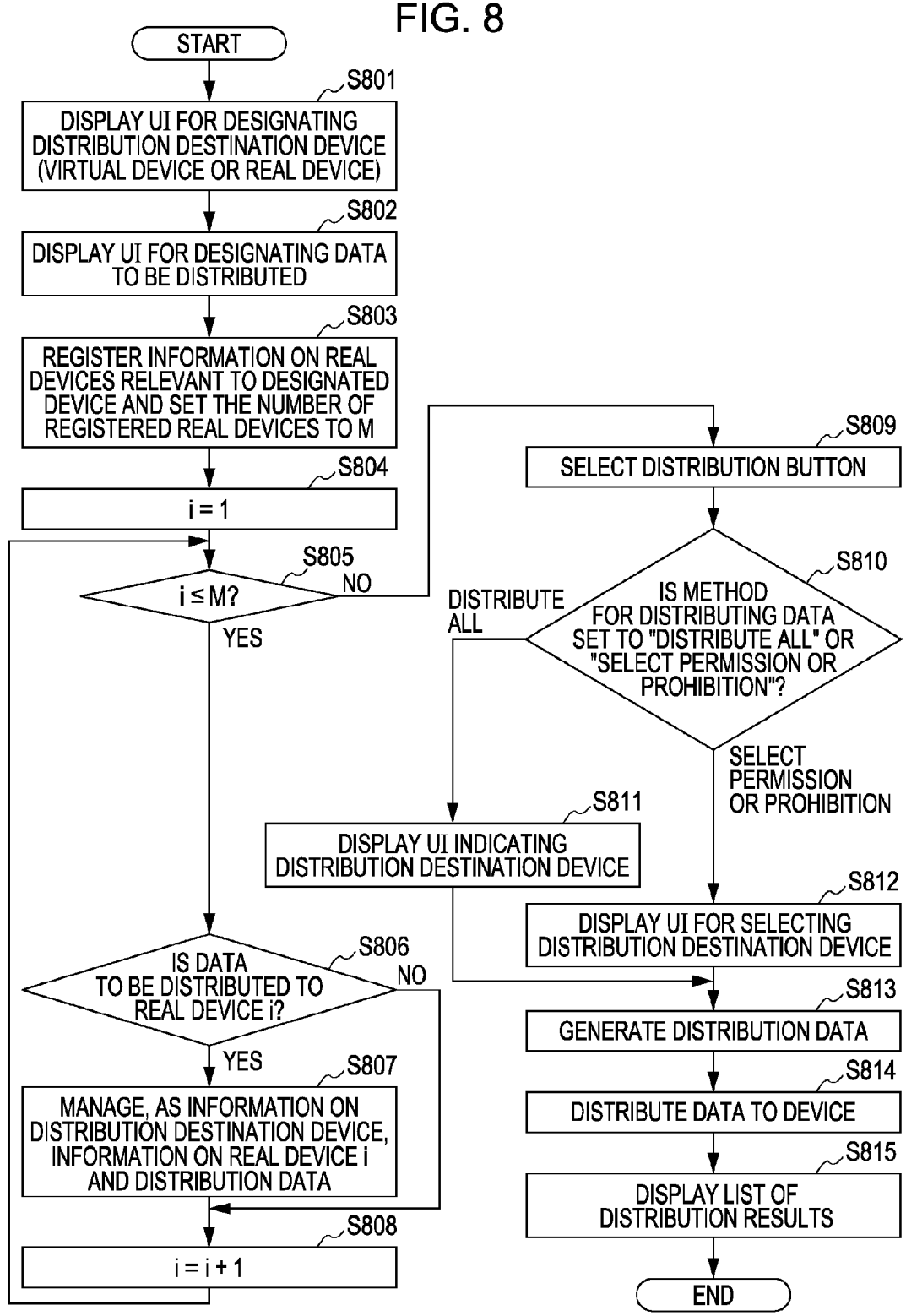
FIG. 8 is a flowchart showing an example of a first data process to be performed by the management system according to the embodiment of the present invention.

FIG. 8 is a flowchart showing an example of a first data process to be performed by the management system according to this embodiment. In this example, the management apparatus 300 shown in FIG. 3 controls resource distribution. Processing of steps S801 to S815 is implemented when the CPU 2001 of the host computer 1000 loads a control program into the RAM 2002 and performs the control program.

In step S801, based on device information managed by the device manager 301, the display controller 302 displays, for example, on the CRT display 2010, a user interface for designating a distribution destination device (virtual device or real device). The display controller 302 also displays, for example, on the CRT display 2010, a user interface for designating the type of a resource to be distributed.

Figure 9:
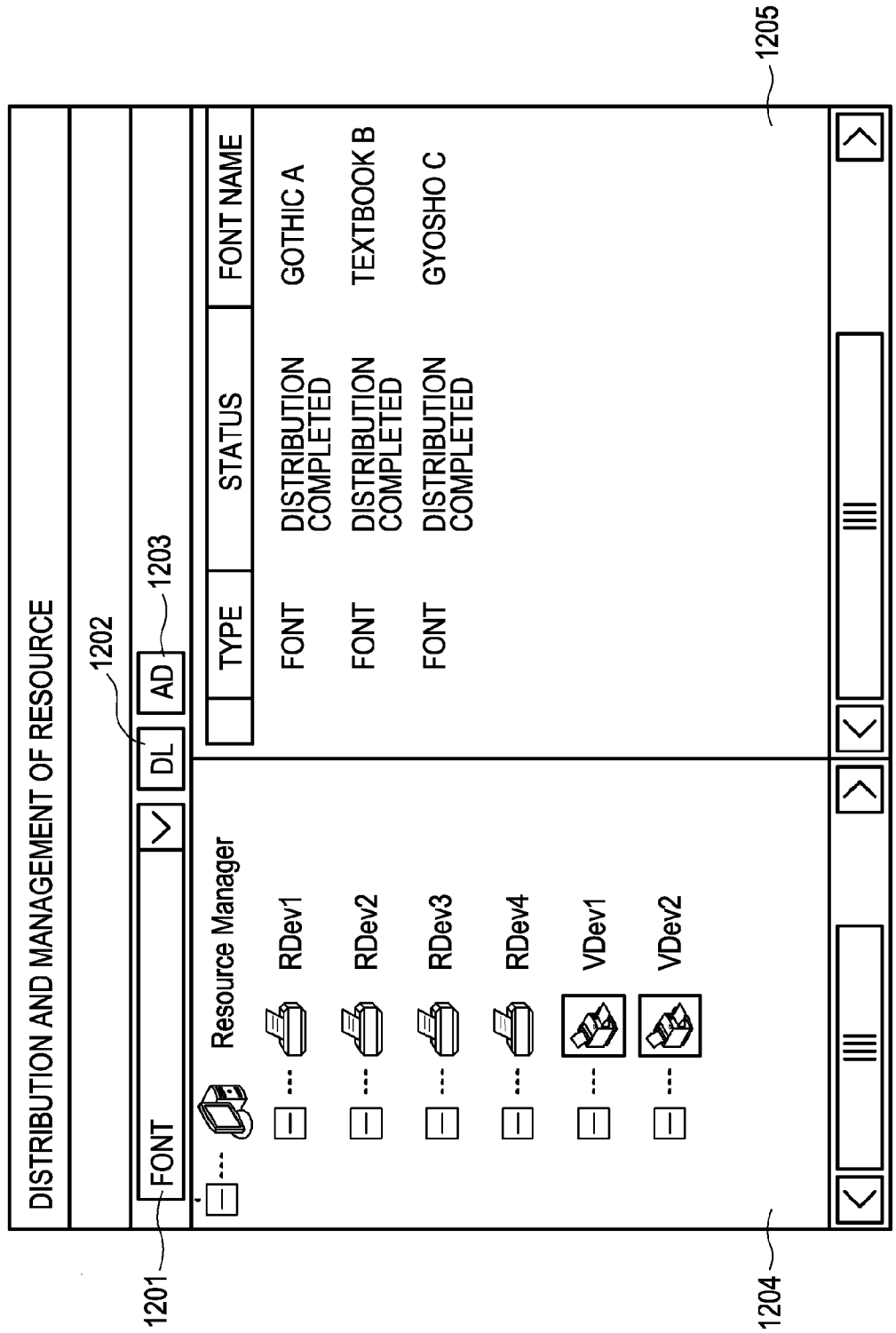
FIG. 9 illustrates an example of a user interface that can be displayed on a cathode-ray tube (CRT) display by a display controller shown in FIG. 3.

FIG. 9 illustrates an example of a user interface that can be displayed on the CRT display 2010 by the display controller 302 shown in FIG. 3. The user interface shown in FIG. 9 is displayed in the processing of step S801.

Referring to FIG. 9, a list of resource types managed by the resource manager 305 is displayed in a combo box 1201. One of the resource types displayed in the combo box 1201 can be selected. In the example shown in FIG. 9, the resource type "font" is selected.

A button 1202 is pressed in order to distribute resource data to a selected device.

A button 1203 is pressed in order to add resource data to be distributed.

A device list managed by the device manager 301 is displayed in a device list display field 1204. In the example shown in FIG. 9, six devices including four real devices and two virtual devices are under the management of the device manager 301.

Resource data distributed to a device managed by the device manager 301 is displayed in a resource data display field 1205. The types of resources, the statuses of resources, and the names of fonts are displayed in the resource data display field 1205.

Resource data that has been added to resource data to be distributed by selecting the button 1203 is also displayed in the resource data display field 1205.

Figures 10, 11:
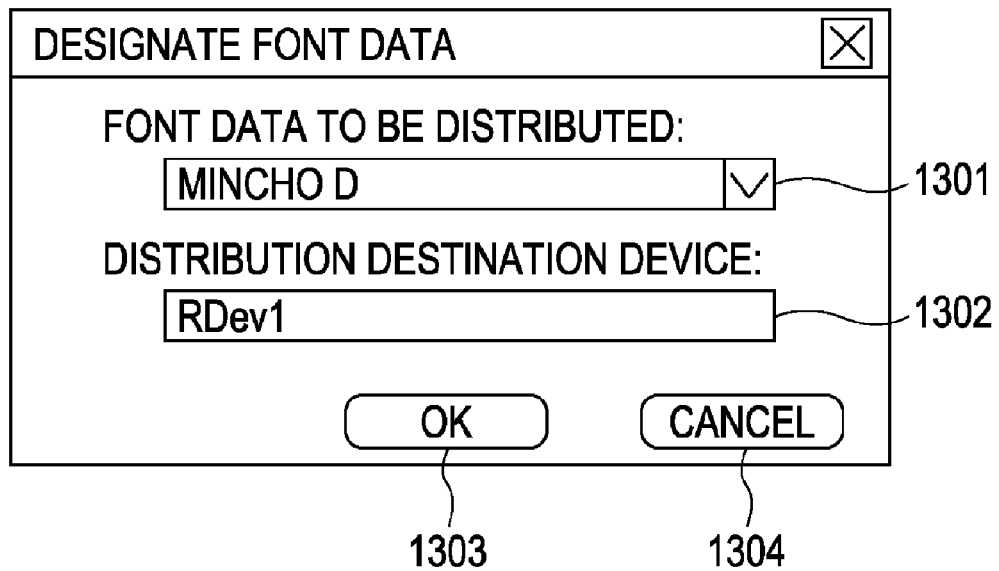
FIG. 10 illustrates an example of a user interface that can be displayed on the CRT display by the display controller shown in FIG. 3.
FIG. 11 illustrates an example of information on a real device relevant to a designated device stored in a device configuration memory unit shown in FIG. 3.

In step S802, the display controller 302 displays, for example, a user interface shown in FIG. 10, for designating resource data to be distributed.

FIG. 10 illustrates an example of a user interface that can be displayed on the CRT display 2010 by the display controller 302 shown in FIG. 3. The user interface shown in FIG. 10 is displayed in the processing of step S802.

More specifically, the user interface shown in FIG. 10 is displayed after the button 1203 shown in FIG. 9 is selected in order to add resource data to be distributed.

Referring to FIG. 10, a list of resource data managed by the resource manager 305 is displayed in a combo box 1301. In the example shown in FIG. 10, "Mincho D" can be selected.

The name of a device designated in step S801 (for example, "RDev1") is displayed in a distribution destination device display field 1302. When a user selects an OK button 1303, resource data to be distributed is added to the resource data displayed in the resource data display field 1205 shown in FIG. 9.

When a cancel button 1304 is selected, no resource data is added, and the user interface shown in FIG. 9 is displayed again.

In step S803, the device manager 301 temporarily stores information on a real device relevant to the designated device.

FIG. 11 illustrates an example of information on a real device relevant to a designated device stored in the device configuration memory unit 303 shown in FIG. 3. In the example shown in FIG. 11, the names of devices relevant to a selected device are registered based on configuration information of a virtual device shown in FIG. 5.

More specifically, three devices "RDev2 (scan)", "RDev1 (print)", and "RDev3 (render)" are relevant to the selected device "VDev1".

In addition, since the selected device "RDev1" is not a virtual device, only the device name "RDev1" is displayed as a relevant device name. The number of relevant devices registered here is set to, for example, "M".

In step S804, the CPU 2001 initializes a device counter "i" to "1".

In step S805, the CPU 2001 compares the number "M" of registered devices with the device counter "i" and determines whether the device counter "i" is less than or equal to the number "M" of registered devices. If it is determined in step S805 that the device counter "i" is less than or equal to the number "M" of registered devices, the process proceeds to step S806. If it is determined in step S805 that the device counter "i" is greater than the number "M" of registered devices, the process proceeds to step S809.

In step S806, for the device corresponding to the device counter "i" (the device temporarily stored in step S803), the CPU 2001 refers to the distribution condition table stored in the resource manager 305 and shown in FIG. 6 indicating conditions under which distribution items are to be distributed, and determines whether distribution data is to be distributed to the device i. If the CPU 2001 determines in step S806 that distribution data is to be distributed to the device i, the process proceeds to step S807. If the CPU 2001 determines in step S806 that distribution data is not to be distributed to the device i, the process proceeds to step S808.

In step S807, device information and information on data to be distributed are temporarily stored in the device manager 301.

FIG. 12 illustrates an example of the correspondence between devices managed by the device manager 301 shown in FIG. 3 and resource data. In the example shown in FIG. 12, a temporary management state regarding devices and resource data is shown.

More specifically, for the device "VDev1", which is a selected virtual device, resource data is to be distributed to the real device "RDev1". In addition, resource data "address list of XX division" is to be distributed. As shown in FIG. 12, in the case of a real device, a selected device name is the same as the name of a distribution destination device to which resource data is to be distributed.

In step S808, the CPU 2001 increments the device counter "i" by one. Then, the process returns to step S805.

In step S809, the CPU 2001 detects that the button 1202 shown in FIG. 9 serving as a distribution button has been selected by the user. Then, the process proceeds to step S810.

In step S810, the CPU 2001 determines whether a distribution method according to the type of distribution data is set to "distribute all" or "select permission or prohibition".

More specifically, the resource manager 305 shown in FIG. 3 checks information on the management table shown in FIG. 7 for managing a resource data distribution method.

In the case that the resource type (attribute) is "font", the distribution method is set to "distribute all", and the process proceeds to step S811.

In the case that the resource type (attribute) is "address list", the distribution method is set to "select permission or prohibition", and the process proceeds to step S812.

In step S811, the display controller 302 displays a user interface to be used for distributing the resource data to all the devices.

Figure 13:
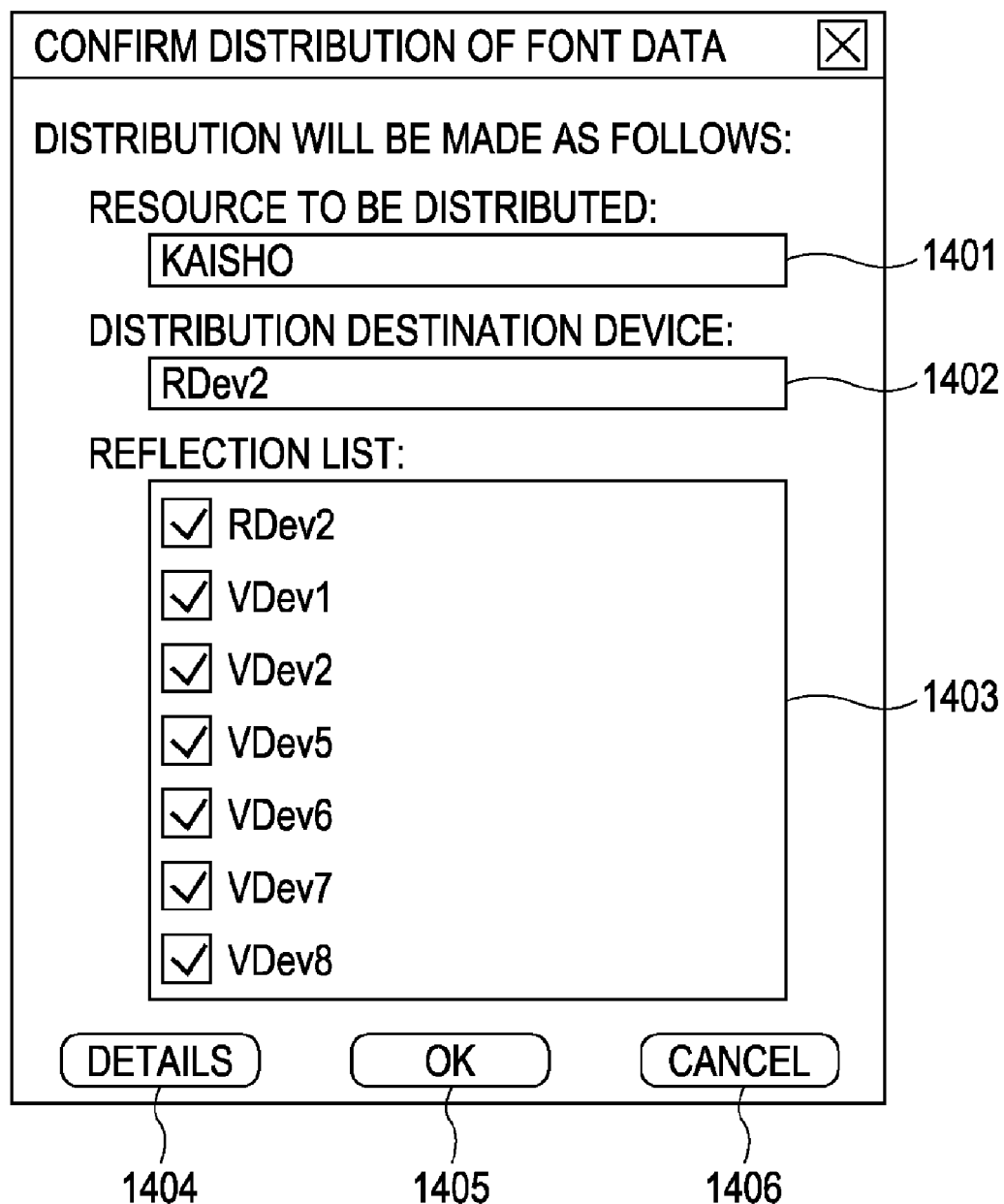
FIG. 13 illustrates an example of a user interface displayed on the CRT display shown in FIG. 1.

FIG. 13 illustrates an example of a user interface displayed on the CRT display 2010 shown in FIG. 1. In the example shown in FIG. 13, a user interface is displayed, as a confirmation screen used for confirming distribution of font data, on the CRT display 2010, under the control of the display controller 302. The device manager 301 generates, based on management information stored by the device configuration memory unit 303, candidate device information. The display controller 302 refers to the candidate device information generated by the device manager 301 and displays a list of candidate devices in a reflection list shown in FIG. 13.

In the example shown in FIG. 13, a state where "Kaisho" is designated as resource data to be distributed is displayed in a field 1401. In addition, a state where "RDev2" is designated as a distribution destination device is displayed in a field 1402.

Results that reflect the distribution of the resource data to the device displayed in the field 1402 are indicated in a reflection list 1403. In the example shown in FIG. 13, since the attribute of the resource data to be distributed is "font", a real device and virtual devices are indicated as candidate devices to which resource data may be distributed and all the checkboxes are ticked in the reflection list 1403. In addition, since the attribute of the resource data to be distributed is "font", both the real device and the virtual devices serve as distribution destination devices.

In the case of the user interface shown in FIG. 13, since "Kaisho" is unconditionally distributed to all the devices, the devices in the reflection list 1403 cannot be selected individually. That is, the reflection list 1403 is displayed in gray under the control of the display controller 302, so that selection of a device cannot be performed.

Figure 14:
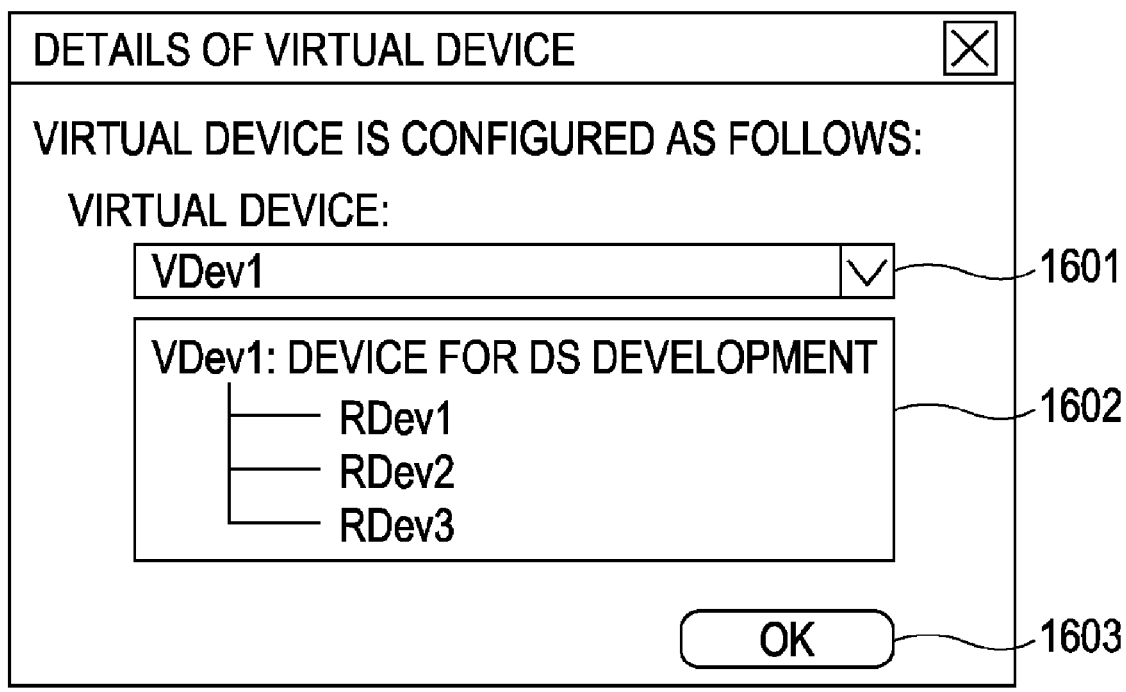
FIG. 14 illustrates an example of a user interface displayed on the CRT display shown in FIG. 1.

In addition, in the case of the user interface shown in FIG. 13, when the user selects a details button 1404, a user interface, for example, shown in FIG. 14, which indicates real devices constituting a virtual device, is displayed on the CRT display 2010.

FIG. 14 illustrates an example of the user interface displayed on the CRT display 2010 shown in FIG. 1. The user interface shown in FIG. 14 indicates the configuration of a virtual device.

Referring to FIG. 14, a virtual device to be displayed is selected in a combo box 1601. In the example shown in FIG. 14, a virtual device "VDev1" is currently selected.

The display controller 302 refers to the virtual device table (see FIG. 5) stored in the device configuration memory unit 303, and displays, in a virtual device configuration display field 1602, information on real devices constituting the virtual device selected in the combo box 1601.

An OK button 1603 is selected by the user in order to exit the user interface shown in FIG. 14.

Referring back to FIG. 13, when the user selects an OK button 1405, the process proceeds to step S813.

When the user selects a cancel button 1406 shown in FIG. 13, the processing is canceled and the user interface shown in FIG. 13 is closed.

Figure 15:
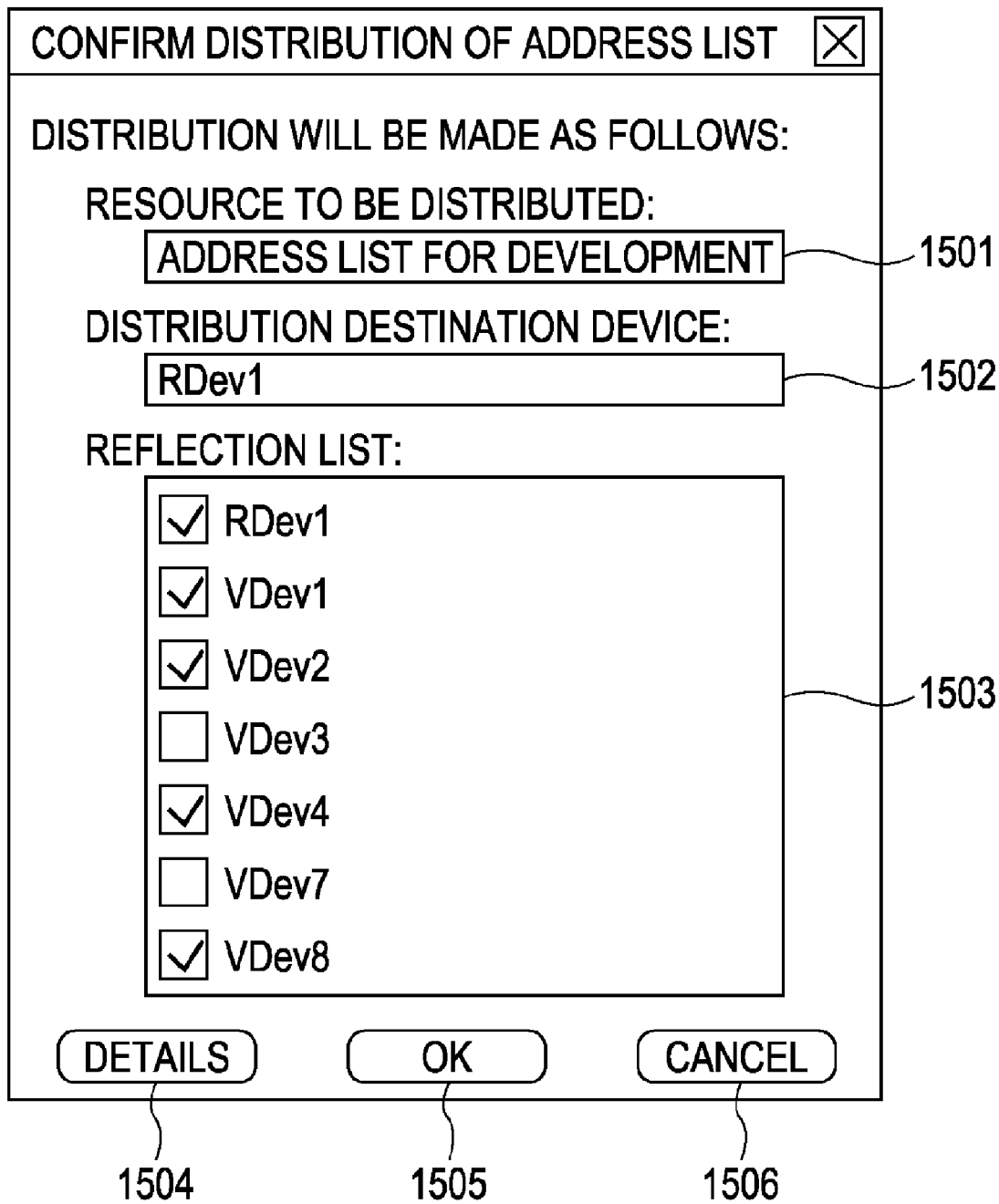
FIG. 15 illustrates an example of a user interface displayed on the CRT display shown in FIG. 1.

Referring back to FIG. 8, in step S812, the display controller 302 displays, on the CRT display 2010, a user interface, for example, shown in FIG. 15, to be used for selecting permission or prohibition of distribution of the resource data.

FIG. 15 illustrates an example of a user interface displayed on the CRT display 2010 shown in FIG. 1. In this example, in step S812, the user interface shown in FIG. 15 is displayed, on the CRT display 2010 under the control of the display controller 302, as a confirmation screen used for confirming distribution of an address list. The device manager 301 generates, based on management information stored in the device configuration memory unit 303, candidate device information. Then, the display controller 302 displays, by referring to the candidate device information generated by the device manager 301, a list of candidate devices in a reflection list shown in FIG. 15.

The display controller 302 switches a display of device names and ticks in checkboxes corresponding to the device names within a reflection list for selecting a distribution destination device, in accordance with an attribute of a resource to be distributed, between the user interface shown in FIG. 13 and the user interface shown in FIG. 15.

Referring to FIG. 15, the name of resource data to be distributed is displayed in a field 1501. In the example shown in FIG. 15, resource data "address list for development" is currently selected and displayed.

The name of a distribution destination device is displayed in a field 1502. In the example shown in FIG. 15, a device "RDev1" is selected by the user. Results that reflect the distribution of the resource data to the device displayed in the field 1502 are indicated in a reflection list 1503. That is, a real device and virtual devices are displayed as candidate devices to which resource data may be distributed and checkboxes corresponding to a real device and virtual devices selected by the user are ticked in the reflection list 1503. Since the attribute of the resource data to be distributed is "address list", only a real device selected by the user, only a virtual device or virtual devices selected by the user, or both a real device and a virtual device or virtual devices selected by the user may be selected as distribution destination devices.

In this case, since "select permission or prohibition" is set for the resource data, a user interface for selecting a device (for ticking, by a user, a checkbox corresponding to a device) serving as a distribution destination device in the reflection list 1503 is provided.

When a details button 1504 is selected, a user interface indicating real devices constituting a virtual device is displayed. The user interface displayed here is similar to the user interface shown in FIG. 14.

When an OK button 1505 is selected, the process proceeds to step S813. If a cancel button 1506 is selected, the processing is canceled and the user interface is closed.

In step S813, based on a result of the selection performed in step S812, the distribution data generator 306 shown in FIG. 3 generates, from information on the devices and resource data (see FIG. 12) temporarily stored in the device manager 301, data to be distributed only to the devices for which corresponding checkboxes are ticked on the user interface shown in FIG. 15. Accordingly, a situation where a resource such as an address list is falsely distributed to an incorrect device not selected as a distribution destination device by the user can be avoided. Moreover, with the use of the user interface shown in FIG. 15, the user is able to confirm a distribution destination device and select a correct distribution destination device without any mistake.

FIG. 16 illustrates an example of the correspondence between a device managed by the device manager 301 shown in FIG. 3 and resource data. The illustration shown in FIG. 16 corresponds to an example of final information on resource data to be distributed to a device.

In the example shown in FIG. 16, a distribution destination device corresponding to the selected device "RDev1" is "RDev1".

In addition, data "address list of XX division" is to be distributed as resource data.

As shown in FIG. 16, although the real device "RDev1" is a component constituting the virtual device "VDev1", the resource data "address list of XX division" cannot be used in the virtual device "VDev1".

In step S814, resource data generated by the distribution data generator 306 is distributed to the selected device via the communication function unit 307.

In step S815, a list of results of resource distribution is displayed using a user interface shown in FIG. 17 under the control of the display controller 302. Then, the process is completed.

FIG. 17 illustrates an example of a user interface displayed on the CRT display 2010 shown in FIG. 1. In the example shown in FIG. 17, in step S815, a list of statuses of devices before and after resources are distributed is displayed as results of distribution under the distribution result displaying control of the display controller 302. In particular, in this example, the status where an address list for development has been distributed to the devices for which corresponding checkboxes are ticked in the reflection list shown in FIG. 15, that is, the devices RDev1, VDev1, VDev2, VDev4, and VDev8, can be identified based on different display manners.

In addition, since the resource data "Kaisho" is distributed to the devices for which corresponding checkboxes are ticked in the reflection list shown in FIG. 13, that is, all the devices RDev2, VDev1, VDev2, VDev5, VDev6, VDev7, and VDev8, the status where the resource data "Kaisho" has been distributed to all the RDev2, VDev1, VDev2, VDev5, VDev6, VDev7, and VDev8 can be confirmed by a follow-up confirmation.

Accordingly, resources having different attributes can be distributed to corresponding devices in accordance with the names of virtual devices and the details of the resources can be easily confirmed by using the interface shown in FIG. 17.

In this embodiment, in accordance with an attribute of a resource to be distributed, displaying of a list of reflected devices can be switched between the display example shown in FIG. 13 and the display example shown in FIG. 15. Thus, a distribution destination device for a resource, such as an address list, which is to be distributed only to a limited device, can be carefully selected while confirming the distribution destination device on a display screen.

That is, in accordance with a display manner on the user interface shown in FIG. 13 or FIG. 15, in the case of a resource (for example, an address list) that is to be used by only a limited user, a distribution destination device can be individually selected.

Accordingly, a situation where a resource (for example, an address list) that is to be used by only a limited user is falsely transmitted to all the devices can be avoided. Thus, the load to be imposed on an administrator who performs management of resources can be further reduced.

Second Embodiment

Although a single device is designated as a distribution destination device in the first embodiment, a plurality of devices are designated in a second embodiment.

Figure 18:
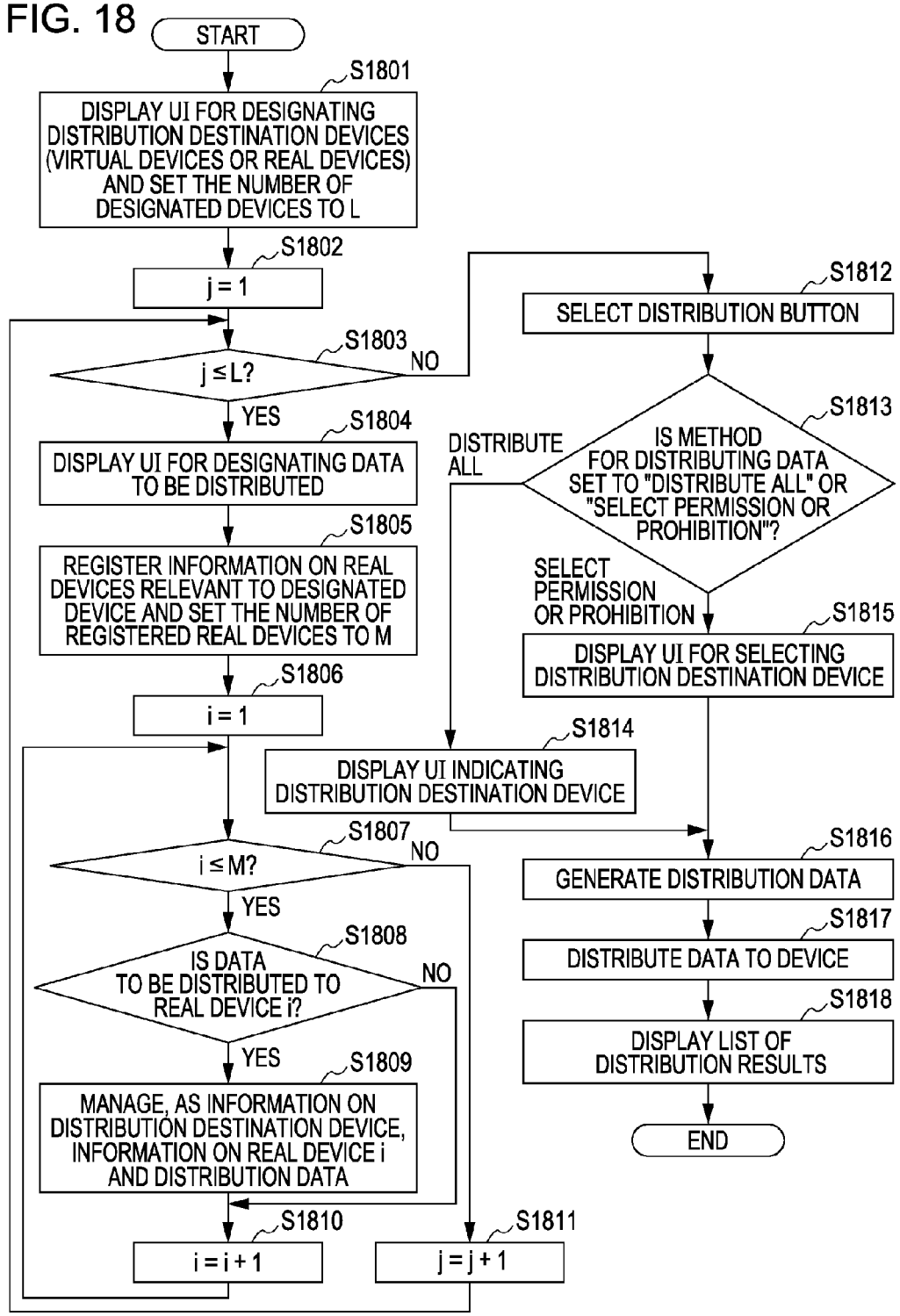
FIG. 18 is a flowchart showing an example of a second data process to be performed by a management system according to an embodiment of the present invention.

FIG. 18 is a flowchart showing an example of a second data process to be performed by a management system according to this embodiment. In this example, the management apparatus 300 shown in FIG. 3 controls resource distribution and a plurality of devices are designated as distribution destination devices. Processing of steps S1801 to S1818 is implemented when the CPU 2001 of the host computer 1000 loads a control program into the RAM 2002 and performs the control program.

In step S1801, based on device information managed by the device manager 301, the display controller 302 displays a user interface for designating distribution destination devices (virtual devices or real devices). The display controller 302 also displays a user interface for designating the type of a resource to be distributed. The number of devices designated here is set to "L".

Figure 19:
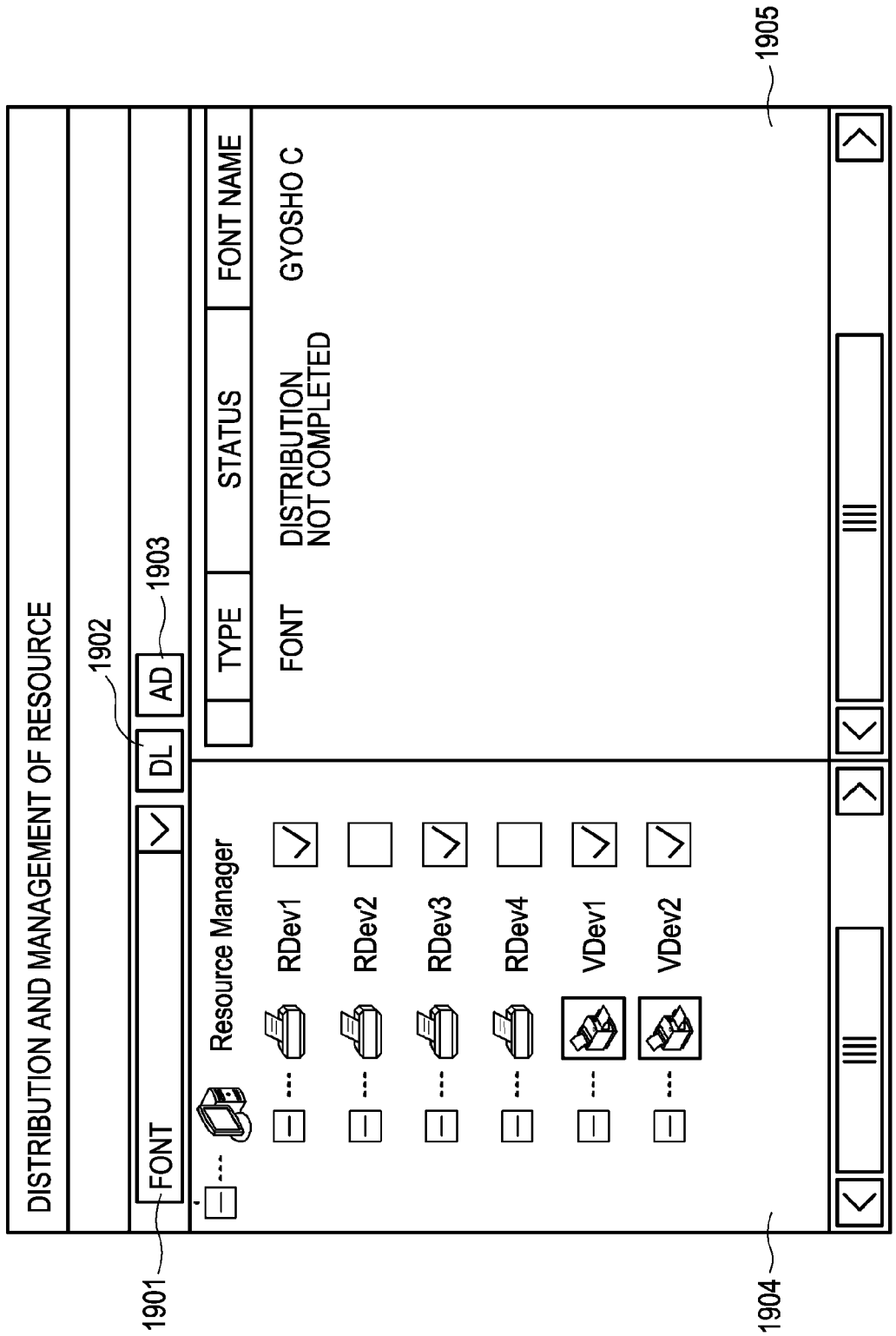
FIG. 19 illustrates an example of a user interface displayed on the CRT display shown in FIG. 1.

FIG. 19 illustrates an example of a user interface displayed on the CRT display 2010 shown in FIG. 1. The user interface shown in FIG. 19 is used for designating distribution destination devices (virtual devices or real devices can be selected) and the type of a resource. This user interface serves as a designation screen on which a user is able to designate a plurality of distribution destination devices and is displayed on the CRT display 2010 under the designation screen displaying control of the display controller 302.

Referring to FIG. 19, a list of types of resources managed by the resource manager 305 is displayed in a combo box 1901. A plurality of devices can be designated by using checkboxes. In the example shown in FIG. 19, real devices "RDev1" and "RDev3" and virtual devices "VDev1" and "VDev2" are currently designated as distribution destination devices to which the resource is to be distributed.

A button 1902 is pressed in order to distribute resource data to designated devices.

A button 1903 is pressed in order to add resource data to be distributed.

A device list managed by the device manager 301 is displayed in a device list display field 1904.

Unlike the first embodiment (FIG. 9), checkboxes are provided in association with device names in the second embodiment. Thus, in the second embodiment, a plurality of devices can be designated at the same time.

Resource data distributed to devices managed by the device manager 301 is displayed in a resource data display field 1905. In the example shown in FIG. 19, the type of resource data, the status of resource data, and the name of a font are displayed in the resource data display field 1905.

Resource data that has been added to resource data to be distributed by selecting the button 1903 is also displayed in the resource data display field 1905.

In step S1802, the CPU 2001 initializes a device counter "j" for the devices selected in step S1801 to "1".

In step S1803, the CPU 2001 compares the number "L" of designated devices with the device counter "j" and determines whether the device counter "j" is less than or equal to the number "L" of designated devices. If it is determined in step S1803 that the device counter "j" is less than or equal to the number "L" of designated devices, the process proceeds to step S1804. If it is determined in step S1803 that the device counter "j" is greater than the number "L" of designated devices, the process proceeds to step S1812.

Since the processing of steps S1804 to S1810 is similar to the processing of steps S802 to S808 of the flowchart shown in FIG. 8 in the first embodiment, the description of the processing of steps S1804 to S1810 will be omitted herein.

In step S1811, the CPU 2001 increments the device counter "j" by one. Then, the process returns to step S1803.

The processing of steps S1812 to S1813 is similar to the processing of step S809 to S810 of the flowchart shown in FIG. 8 in the first embodiment.

In step S1814, the display controller 302 displays a user interface to be used for distributing the resource data to all the devices.

Figure 20:
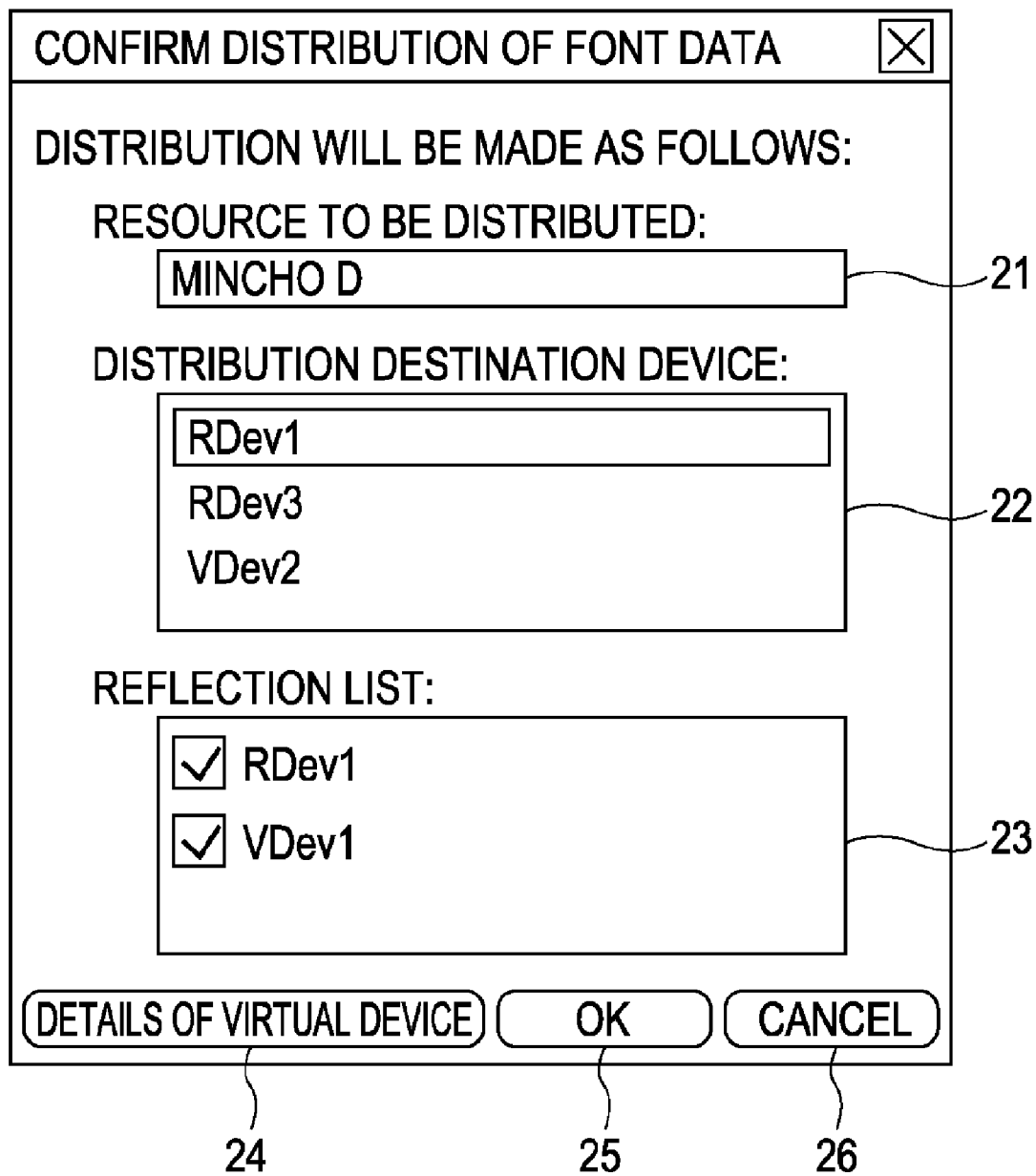
FIG. 20 illustrates an example of a user interface displayed on the CRT display shown in FIG. 1.

FIG. 20 illustrates an example of a user interface displayed on the CRT display 2010 shown in FIG. 1. The user interface shown in FIG. 20 is displayed by the display controller 302 in step S1814 so that the user can confirm distribution of font data.

Referring to FIG. 20, the name of resource data to be distributed is displayed in a field 21. In the example shown in FIG. 20, a resource name "Mincho D" is selected and displayed.

The name or names of one or more distribution destination devices are displayed in a field 22. In the example shown in FIG. 20, real devices "RDev1" and "RDev3" and virtual devices "VDev2" are selected and displayed.

The names of the devices that reflect the distribution of the resource data to the devices selected in the list in the field 22 are displayed in a reflection list 23.

In this case, since the resource data is unconditionally distributed to all the devices, reflected devices cannot be selected on the user interface shown in FIG. 20. That is, the names of devices are displayed in gray.

When a details button 24 is selected, a user interface indicating real devices constituting a virtual device is displayed. The user interface displayed here is similar to the user interface shown in FIG. 14.

When an OK button 25 is selected, the process proceeds to step S1816. When a cancel button 26 is selected, the processing is canceled and the user interface is closed.

In step S1815, the display controller 302 displays a user interface to be used for selecting permission or prohibition of distribution of the resource data.

Figure 21:
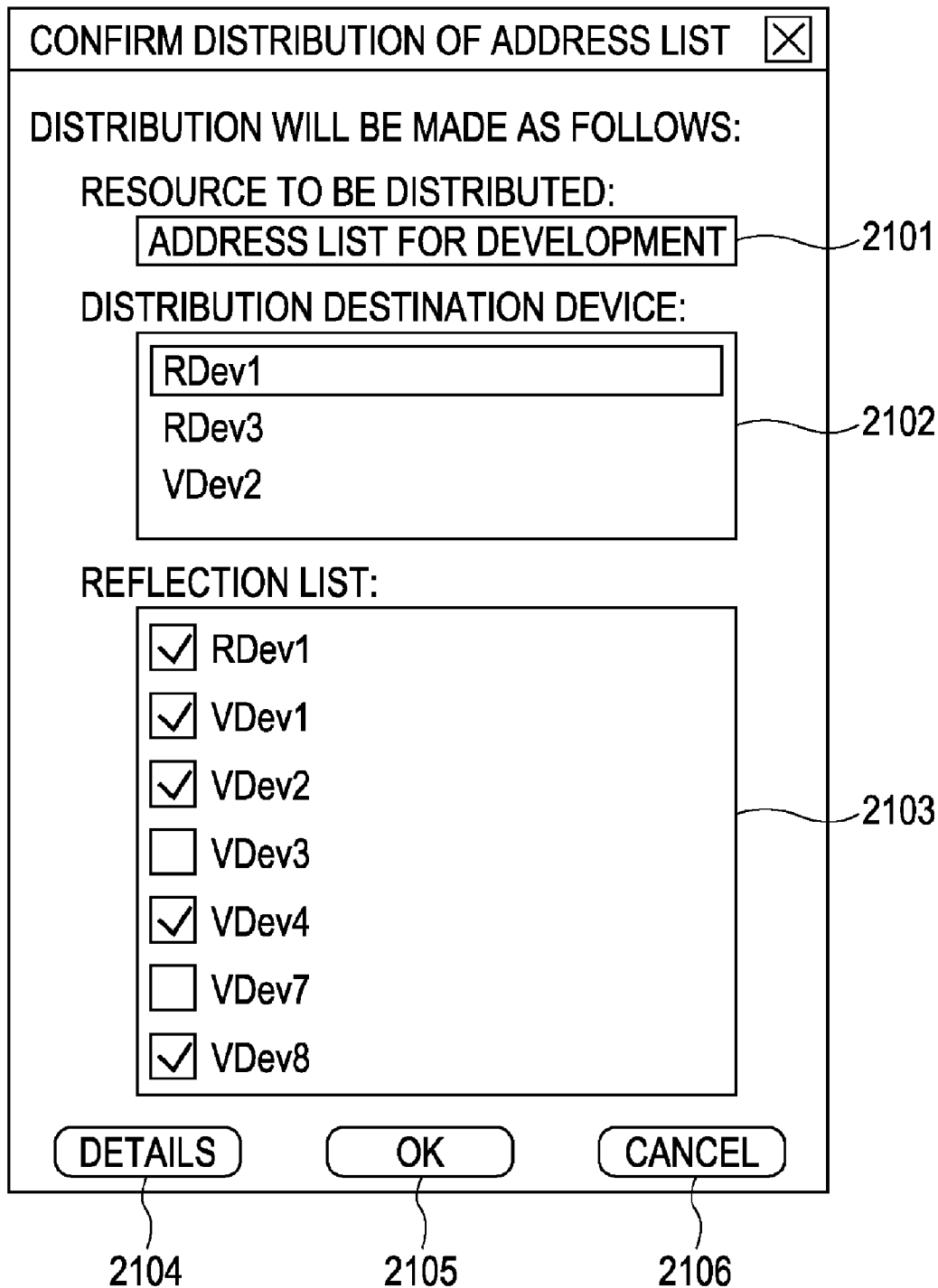
FIG. 21 illustrates an example of a user interface displayed on the CRT display shown in FIG. 1.

FIG. 21 illustrates an example of a user interface displayed on the CRT display 2010 shown in FIG. 1. The user interface shown in FIG. 21 is displayed for confirmation of an address list in step S1815 under the UI displaying control of the display controller 302 so that the user is able to select a plurality of distribution destination devices.

Referring to FIG. 21, the name of resource data to be distributed is displayed in a field 2101. In the example shown in FIG. 21, resource data "address list for development" is currently selected and displayed. The name or names of one or more distribution destination devices are displayed in a field 2102. In the example shown in FIG. 21, real devices "RDev1" and "RDev3" and a virtual device "VDev2" are selected and displayed.

The names of the devices that reflect the distribution of the resource data to the devices selected in the list shown in the field 2102 are displayed in a reflection list 2103.

In this case, "select permission or prohibition" is set for the resource data, a distribution destination device can be selected on the user interface (selection can be performed by using checkboxes).

When a details button 2104 is selected on the user interface shown in FIG. 21, a user interface indicating real devices constituting a virtual device is displayed.

The user interface displayed here is similar to the user interface shown in FIG. 14. When an OK button 2105 is selected, the process proceeds to step S1816. When a cancel button 2106 is selected, the processing is canceled and the user interface is closed.

The processing of step S1816 and the subsequent processing are similar to the processing of step S813 and the subsequent processing of the flowchart shown in FIG. 8 in the first embodiment.

Accordingly, in accordance with the names of virtual devices, resources having different attributes can be distributed to a plurality of selected devices and the details of distribution can be easily confirmed by using the user interface shown in FIG. 17.

In this embodiment, in accordance with an attribute of a resource to be distributed, displaying of a list of reflected devices can be switched. Thus, a distribution destination device for a resource, such as an address list, which is to be distributed only to a limited device, can be carefully selected while confirming the distribution destination device on a display screen.

That is, in accordance with a display manner on the user interface shown in FIG. 13 or FIG. 15, in the case of a resource (for example, an address list) that is to be used by only a limited user, a distribution destination device can be individually selected.

Accordingly, a situation where a resource (for example, an address list) that is to be used by only a limited user is falsely transmitted to all the devices can be avoided. Thus, the load to be imposed on an administrator who performs management of resources can be further reduced.

Other Embodiments

The configuration of data processing programs readable by a management apparatus according to an embodiment of the present invention will be described with reference to a memory map shown in FIG. 22.

FIG. 22 illustrates a memory map of a storage medium in which various data processing programs readable by a management apparatus according to an embodiment of the present invention are stored.

Although not particularly illustrated, information managing a program group stored in the storage medium, such as version information and a creator, may be stored and information that depends on an OS or the like reading a program, such as an icon identifying the program, may be stored.

Furthermore, data depending on various programs is managed by the above-mentioned directory. In addition, a program for installing the various programs into a computer, a decompressing program for decompressing a compressed program to be installed, and the like may be stored.

The functions shown in FIGS. 8 and 18 in the foregoing embodiments may be executed by a host computer in accordance with an externally installed program. In this case, the present invention is also applicable to a case where an information group including the program is supplied from a storage medium, such as a CD-ROM, a flash memory, or a floppy disk, or from an external storage medium via a network, to an output device.

As described above, a storage medium on which program code of software for attaining the functions of the foregoing embodiments is recorded is supplied to a system or an apparatus. Embodiments of the present invention may be achieved by reading and executing the program code stored in the storage medium by a computer (or a CPU or a microprocessing unit (MPU)) of the system or the apparatus.

In this case, the program code itself read from the storage medium attains new functions of present invention, and the storage medium storing the program code constitutes the present invention.

Thus, any type of program, such as object code, a program to be executed by an interpreter, or script data to be supplied to the OS, may be used as long as it includes a function of a program.

The storage medium for supplying a program may be, for example, a floppy disk, a hard disk, an optical disc, a magneto-optical disc, an MO, a CD-ROM, a compact disc-recordable (CD-R), a compact disc (CD)-rewritable (CD-RW), a magnetic tape, a nonvolatile memory card, a ROM, a digital versatile disc (DVD), or the like.

In this case, the program code itself read from the storage medium attains the functions of the foregoing embodiments, and the storage medium storing the program code constitutes the present invention.

In addition, the program may be supplied by connecting to a web page on the Internet using a browser of a client computer and by downloading a computer program according to an aspect of the present invention or a compressed file having an automatic installation function from the web page to a storage medium, such as a hard disk. In addition, the program may be supplied by dividing the program code constituting the program according to an aspect of the present invention into a plurality of files and by downloading the divided files from different web pages. That is, a World Wide Web (WWW) server, a file transfer protocol (FTP) server, and the like for allowing a plurality of users to download a program file for realizing function processing of an aspect of the present invention on a computer also fall within the scope of the present invention.

A program according to an aspect of the present invention may be encrypted and stored in a storage medium, such as a CD-ROM, and may be distributed to users. Only a user who satisfies predetermined conditions may be able to download key information for decrypting the encrypted program from a web page via the Internet. In addition, the encrypted program can be executed by using the downloaded key information and can be installed to a computer.

In addition, the functions of the foregoing embodiments can be attained not only by executing the read program code by the computer but also by performing part or all of the actual processing by an OS or the like running on the computer, for example, on the basis of instructions of the program code.

Furthermore, the program code read from the storage medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

The present invention is not limited to the foregoing embodiments. Various modifications including organic combinations of the foregoing embodiments may be made within the spirit and scope of the present invention. Such various modifications may also fall within the scope of the present invention.

Various examples and embodiments of the present invention have been explained. It should be understood by those skilled in the art that the spirit and scope of the present invention are not limited to a specific description of this specification.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-273360 filed Oct. 22, 2007, which is hereby incorporated by reference herein in its entirety.

What is claimed is:

1. An apparatus for managing a plurality of network devices, comprising:
   a memory unit configured to store management information in which a virtual device performing processing by cooperation of functions of network devices, the network devices constituting the virtual device, and the functions implemented by the network devices are associated with each other;
   a designation unit configured to designate, in accordance with an instruction issued by a user, resource data to be distributed and a distribution destination device to which the resource data is to be distributed;
   a generation unit configured to, by referring to the management information stored in the memory unit, generate candidate device information including information on a network device and a virtual device relevant to the distribution destination device designated by the designation unit, wherein the candidate device information is used for indicating candidate devices to which the resource data may be distributed;
   a switching unit configured to, when a confirmation screen, on which the user confirms an actual distribution destination device for the resource data, is displayed based on the distribution destination device designated by the designation unit and the candidate device information generated by the generation unit, switch a display to be used for designating a distribution destination device from among the candidate devices, in accordance with an attribute of the resource data; and
   a distribution unit configured to distribute, to the distribution destination device designated by the designation unit and the distribution destination device designated on the confirmation screen, the resource data designated by the designation unit.

2. The apparatus according to claim 1,
   wherein the switching unit switches the display, in accordance with the attribute of the resource data, between a screen on which the user confirms that the resource data is to be distributed to all the candidate devices contained in the candidate device information generated by the generation unit and a screen on which the user is able to select an actual distribution destination device from among the candidate devices contained in the candidate device information generated by the generation unit.

3. The apparatus according to claim 1,
wherein when a virtual device is designated as the distribution destination device, the distribution unit refers to the management information stored in the memory unit and distributes the resource data to a network device implementing a function corresponding to the resource data.

4. The apparatus according to claim 1, further comprising:
a distribution result displaying control unit configured to display results of the distribution of the resource data to at least one of the network device and the virtual device.

5. The apparatus according to claim 1, further comprising:
a designation screen displaying control unit configured to display a designation screen on which the user is able to designate a plurality of distribution destination devices as distribution destination devices designated by the designation unit.

6. A method for use in an apparatus for managing a plurality of network devices, where the management apparatus stores management information in which a virtual device performing processing by cooperation of functions of network devices, the network devices constituting the virtual device, and the functions implemented by the network devices are associated with each other, the method comprising:
designating, in accordance with a received instruction, resource data to be distributed and a distribution destination device to which the resource data is to be distributed;
generating, by referring to the management information, candidate device information including information on a network device and a virtual device relevant to the designated distribution destination device, wherein the candidate device information is used for indicating candidate devices to which the resource data may be distributed;
switching, when a confirmation screen, on which a user confirms an actual distribution destination device for the resource data, is displayed based on the designated distribution destination device and the generated candidate device information, a display to be used for designating a distribution destination device from among the candidate devices, in accordance with an attribute of the resource data; and
distributing the designated resource data to the designated distribution destination device and the distribution destination device designated on the displayed confirmation screen.

7. The method according to claim 6,
wherein the display is switched, in accordance with the attribute of the resource data, between a screen on which the user confirms that the resource data is to be distributed to all the candidate devices contained in the generated candidate device information and a screen on which the user is able to select an actual distribution destination device from among the candidate devices contained in the generated candidate device information.

8. The method according to claim 6,
wherein when a virtual device is designated as the distribution destination device, the management information is referred to and the resource data is distributed to a network device implementing a function corresponding to the resource data.

9. The method according to claim 6, further comprising:
displaying results of the distribution of the resource data to at least one of the network device and the virtual device.

10. The method according to claim 6, further comprising:
displaying a designation screen on which the user is able to designate a plurality of distribution destination devices.

11. A non-transitory computer-readable storage medium storing a program for performing the method according to claim 6.

* * * * *